United States Patent [19]
Kunz

[11] 3,793,125
[45] Feb. 19, 1974

[54] METHOD OF MAKING WOOD-CHIP BOARDS

[75] Inventor: Albrecht Kunz, Gschwend, Germany

[73] Assignee: Uniboard AG, Zug, Switzerland

[22] Filed: May 7, 1971

[21] Appl. No.: 141,301

[30] Foreign Application Priority Data
June 24, 1970 Germany............................ 2031296

[52] U.S. Cl................ 156/62.2, 156/220, 156/279, 161/DIG. 3, 161/119, 161/162, 161/166, 161/268, 264/112, 264/113, 264/119
[51] Int. Cl........................... B29j 5/02, B32b 21/02
[58] Field of Search.. 156/219, 220, 245, 289, 62.2; 161/DIG. 3, 119, 120, 268; 264/112, 113, 119

[56] References Cited
UNITED STATES PATENTS

| 3,423,267 | 1/1969 | Munk.................................. | 264/112 |
| 3,303,081 | 2/1967 | Michaelson et al.................. | 156/219 |
| 3,098,781 | 7/1963 | Greten................................ | 264/113 |
| 2,624,079 | 1/1953 | Duvall................................ | 264/113 |
| 3,674,619 | 7/1972 | Scher et al......................... | 161/119 |
| 3,373,233 | 3/1968 | Rondum............................. | 264/119 |
| 3,565,739 | 2/1971 | Ianuzzi et al...................... | 161/119 |
| 2,666,726 | 1/1954 | King et al. ......................... | 156/220 |

FOREIGN PATENTS OR APPLICATIONS

| 591,725 | 2/1960 | Canada......................... | 161/DIG. 3 |
| 961,736 | 6/1964 | Great Britain...................... | 161/162 |

*Primary Examiner*—George F. Lesmes
*Assistant Examiner*—Charles E. Lipsey
*Attorney, Agent, or Firm*—Werner W. Kleeman

[57] ABSTRACT

A method for fabricating a wood-chip board equipped with at least one decorative layer provided with relief-like formed portions which comprises the steps of forming pre-compressed chip stock composed of at least a coarse chip layer and a fine chip layer. A deformable decorative layer is placed on top of the fine chip layer. A relief carrier provided with relief-like protuberances is inserted between the decorative layer and a substantially flat press member placed over such decorative layer. Then, during the same working operation the chip stock and the decorative layer are pressed and glued together and a relief-like pattern is formed at the decorative layer and at least at the neighboring portions of the fine chip layer.

The wood-chip board produced according to the inventive method comprises a coarse chip layer and at least one fine chip layer arranged upon said coarse chip layer. A relief-like decorative layer is located on said fine chip layer. The decorative layer possesses formed portions extending into the fine chip layer, and said decorative layer consists of a single material layer.

6 Claims, 4 Drawing Figures

PATENTED FEB 19 1974　　3,793,125
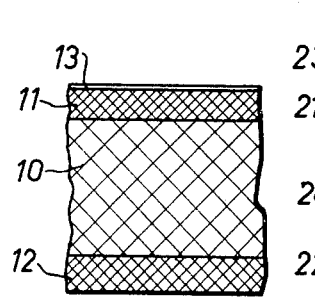
Fig. 1
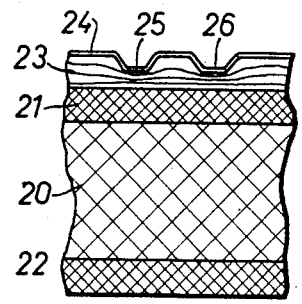
Fig. 2
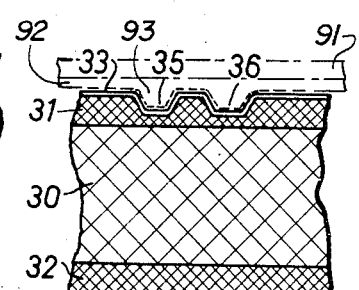
Fig. 3
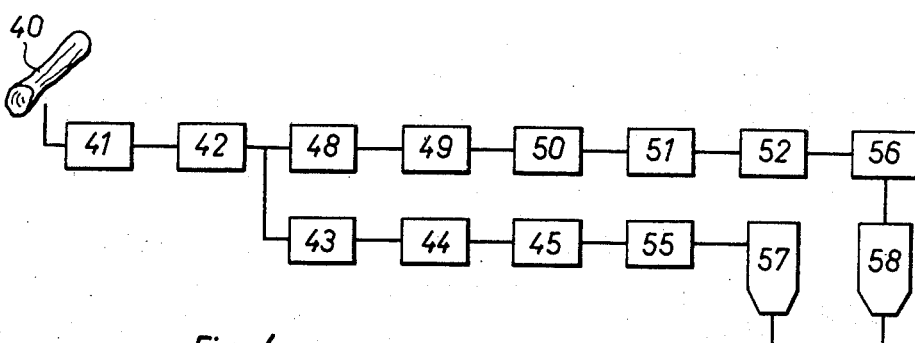
Fig. 4
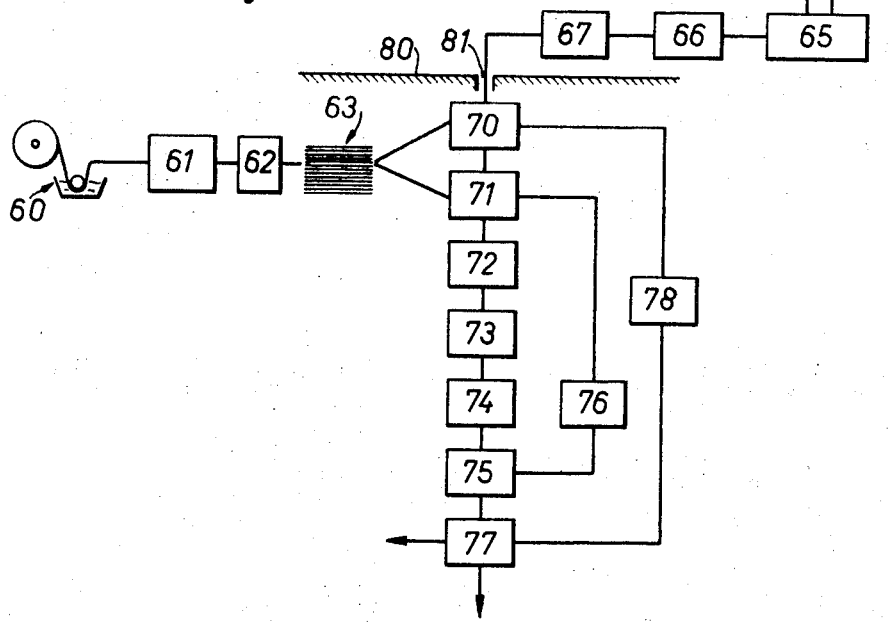

METHOD OF MAKING WOOD-CHIP BOARDS

BACKGROUND OF THE INVENTION

The present invention relates to a new and improved method for the fabrication of wooden chip boards and also concerns novel chip boards produced according to the inventive method.

Chip boards were originally developed primarily for affording a rational utilization of wood waste. However, owing to their advantageous properties they have become extensively used as structural elements which have considerably replaced and heretofore employed massive wooden plates or panels used in the construction of furniture and internal finishing and construction work. Such wood-chip boards typically embody an intermediate layer containing coarse shavings and two external layers containing fine shavings or grinding dust. During fabrication the three superimposed chip fills or stocks corresponding to the layers of the chip board are pressed and glued together in the same operation by means of a flat press technique. In order to save on post-treating the outer surfaces of the wood-chip boards decorative chip boards have been developed where at least one of the outer layers is covered with an additional decorative layer. In the simplest situation this decorative layer can be adhesively bonded or glued to a finished wood-chip board, the surface of which has been appropriately machined or worked. However, techniques have also become known to the art in which a paper layer imbued with a thermosetting resin and optionally provided with a printed pattern is placed upon the multi-layer chip stock prior to the pressing operation and simultaneously pressed and glued together with the chip stock. With the last-mentioned method, where the support surface for the decorative layer cannot be subsequently worked, for the purpose of providing an optimumly smooth decorative layer there is used for the external layer of the chip board shavings or chips which are as fine as possible or wood grinding dust, or a mixture of both, which compensate all irregularities brought about, for instance, by protruding coarse shavings of the intermediate layer.

Decorative chip boards are also already known to the art wherein the decorative layer contains relief-like formed portions. A decorative carrier is arranged between the outer decorative layer and the neighboring outer layer of the chip board, this decorative carrier consisting of a number of layers of paper imbued with a phenolic resin. During fabrication of such decorative chip boards initially the individual layers of the decorative carrier and the decorative layer are pressed and glued together into a relief layer in a heated press having a press punch possessing a press surface which has been machined or worked in a suitable manner or while using an appropriate intermediate layer between the press punch and the decorative layer. The finished, hardened relief layer is then adhesively bonded or glued to a finished pressed wood-chip board.

Although it is possible to manufacture the decorative chip boards in a single working operation three separate working operations must be used for the fabrication of the decorative boards equipped with the relief-like deformations, and additionally, apart from the chip fill or stock and the decorative foil there must be further used an additional decorative carrier. This increases both the cost of manufacture as well as also the materials used during such manufacturing operation.

SUMMARY OF THE INVENTION

Therefore, there is still present a real need in the art for an improved method for the fabrication of wood-chip boards which is not associated with the aforementioned drawbacks of the prior art manufacturing techniques. Hence, a primary objective of this invention relates to a novel method of manufacturing woodchip boards as well as novel wood-chip boards produced according to the inventive method, which satisfactorily fulfill the existing need in the art and overcome the aforementioned drawbacks experienced in the state-of-the-art manufacturing techniques.

Another and more specific object of the present invention relates to an extremely economical manufacturing technique for the production of wood-chip boards in a rational manner at relatively lower cost than heretofore required when practicing conventional manufacturing techniques.

A further significant object of this invention relates to improved wood-chip boards fabricated in accordance with the inventive method.

Now, in order to implement these and still further objects of the invention, which will become more readily apparent as the description proceeds, it has been surprisingly found that it is possible to fabricate a decorative chip board equipped with relief-like formed portions, and wherein it is possible to dispense with the use of a relief carrier layer between the external layer and the decorative layer, if there is used instead of the conventional fine chips or shavings or the ground dust, fibre-like fine chips or shavings. These fibre-like fine chips or shavings may be advantageously of the type disclosed in French Pat. No. 1,571,030. Through the use of the fibre-like fine shavings the fill or stock of the external layer provides an easily deformable cushion layer. Such relief decorative plates or boards can be manufactured in a single working operation, as such has been described in French Pat. No. 1,577,172 for conventional decorative plates or boards.

Thus the method aspects of this invention are concerned with the manufacture of wood-chip boards with at least one decorative layer provided with relief-like formed portions. According to the method aspects of this invention there is placed upon the layer of the chip board containing the fine chips or shavings of a pre-pressed chip stock containing at least one coarse chip-layer and one fine chip-layer, a deformable decorative layer. In the same working operation the chip stock and the decorative layer are pressed and glued together, and the decorative layer and at least the neighboring portion of the fine chip layer are formed to possess a relief-like appearance. According to an important aspect of the invention for producing the just-mentioned relief-like formed portion there is arranged between the decorative layer and a planar or flat sheet-metal press member a relief carrier equipped with relief-like raised portions or protuberances. This relief carrier may be separate from, or integral with, the aforesaid press member.

Continuing, it is here mentioned that wood-chip boards fabricated according to the new and improved method aspects of this invention embody a coarse chip layer, at least a fine chip layer and a decorative layer arranged upon the fine chip layer. This decorative layer exhibits relief-like formed portions which extend into the fine chip layer. The inventive wood-chip board manifests itself by the feature that the decorative layer consists of a single material layer.

The novel wood-chip board of the invention can possess deeper and cleaner bounded formed portions than the heretofore known prior art boards, because during pressing-in of the formed portions the chips or shavings of the finechip layer and which chips have not yet been glued together, such can displace relative to one another, whereas with the above-described decorative carrier the individual layers of the carriers must be more markedly compressed for producing the formed portions. Moreover, the novel wood-chip board of the invention can also be fabricated much more inexpensively because there is not employed any additional decorative carrier and the board can be fabricated in a single working operation like conventional decorative boards.

BRIEF DESCRIPTION OF THE DRAWING

The invention will be better understood and objects other than those set forth above, will become apparent when consideration is given to the following detailed description thereof. Such description makes reference to the annexed drawing illustrating both the state-of-the-art and the invention, and wherein;

FIG. 1 schematically illustrates the different layers of a prior art wood-chip board covered at one side with a decorative layer;

FIG. 2 schematically illustrates the different layers of a likewise prior art wood-chip board covered at one side with a decorative layer exhibiting relief-like formed portions or depressions;

FIG. 3 illustrates a preferred embodiment of inventive wood-chip board equipped at one side with a decorative layer exhibiting relief-like formed portions and at the other side equipped with a flat or planar decorative layer; and FIG. 4 is a block diagram of apparatus for manufacturing according to a preferred embodiment of the method aspects of this development inventive wood-chip boards corresponding to those illustrated in FIG. 3.

DETAILED DESCRIPTION OF THE PREFERRED EMBODIMENTS

Referring now to the drawing it is here remarked that initially, for the purpose of fully explaining the concepts of the invention, various constructional forms of wood-chip boards manufactured according to prior art techniques will be initially discussed. This will enable one to have a better understanding of the wood-chip boards manufactured according to the invention and the inventive manufacturing techniques for the production thereof. Hence, describing now specifically the drawing, and turning attention in particular to FIG. 1 there is schematically shown in sectional view a prior art decorative chip board which will be seen to embody an intermediate layer 10 containing coarse shavings or chips and two external layers 11 and 12 containing fine chips. A decorative layer 13 is applied to one of the external layers, here layer 11. The intermediate layer 10 is approximately 12 millimeters thick and each of the two external layers approximately 3 millimeters thick. The coarse shavings or chips for the intermediate layer 10 possess lateral length up to 10 millimeters, whereas the fine chips of both external layers 11, 12, if the decorative board is formed in accordance with the afore-mentioned French patents, are fibre-like or fibre-shaped and with a diameter less than 0.1 millimeter exhibit a fineness ratio of at least 1:50. The chips and the decorative layer are glued together by means of a thermosetting resin, preferably a urea formaldehyde resin.

FIG. 2 similarly illustrates a prior art construction of decorative chip board, the decorative layer of which is formed in relief-like fashion. Just as was the case for the chip board of FIG. 1, here also the decorative board of FIG. 2 contains an intermediate layer 20 and two external layers 21 and 22. A decorative carrier 23 is glued to the one external layer 21. Dcorative carrier 23 consists of a number of, for instance 15 superimposed layers of Kraft paper imbued with a phenolic resin and at the outside of this stack of Kraft paper there is arranged the actual decorative layer 24. Relief-like depressions or formed portions 25, 26 are pressed into the decorative layer 24 and the individual layers of the decorative carrier 23 which are located beneath the topmost decorative layer 24. Thus as will be seen by referring to FIG. 2 the deformation of the layers of the decorative carrier 23 decreases with increasing depth and, thus, the lowermost layer is practically flat or planar. During the fabrication of such decorative board the decorative carrier and the chip board are manufactured independently of one another and thereafter pressed and glued to one another.

With the foregoing background of typical constructions of prior art decorative chip boards attention is now invited to FIG. 3 illustrating a preferred embodiment of wood-chip board fabricated according to the invention. Here also the chip board contains an intermediate or central layer 30 and two external or outside layers 31 and 32. Both external layers 31 and 32 are covered with a decorative layer 33 and 34, as shown. While the decorative layer 34 is flat or planar the other decorative layer 33, similar to the decorative layer 24 of the decorative board of FIG. 2, possesses relief-like formed portions or depressions 35 and 36. Since the novel decorative board of the invention consists of fibre-shaped fine chips, and thus possesses external layers acting as deformable cushion layers and since the depth of the formed portions or recesses is deeper than the thickness of the decorative layer the external layer 31 of the chip board is also formed in relief-like fashion, as shown.

It is here remarked that although in FIGS. 1 to 3 the intermediate layer and the external layers have been shown sharply defined with respect to one another in reality these layers at least partially merge with one another because the finer chips or shavings of the external layers tend to penetrate to a limited degree between the coarse shavings of the intermediate layer.

Having now had the benefit of considering a preferred form of inventive wood-chip board attention is invited to the block or flow diagram of FIG. 4 illustrating equipment for practicing a preferred manifestation of the inventive method for the fabrication of the novel decorative boards of the invention equipped with the relief-like formed portions or recesses. Inasmuch as the individual hardware components and stations which are used during the fabricating technique are well known to the art they have only been schematically illustrated. The teachings of the invention are not limited to the specific details of the hardware and prior art constructions of apparatus can be assembled together into the overall manufacturing equipment for the practice of the inventive method.

Turning now specifically to the block diagram of FIG. 4 it should be understood that the supplied round timber 40 for the coarse chips of the intermediate layer are cut up on a chopper 41 into wooden pieces possessing a length of 4 to 6 centimeters, a width of 4 to 5 centimeters and a thickness of 1 to 3 centimeters. Thereafter these wooden pieces are cut in a cutter or chopper 42 into flat chips or shavings possessing a length of 10 to 30 millimeters, a width of 3 to 20 millimeters and a thickness of 0.1 to 1 millimeter. It has also already been proposed to cut or shave the circular or round timber directly into chips or shavings possessing the desired dimensions, resulting in saving almost half of the expended electrical energy. The flat chips or shavings are then sieved by a sieve device 43 having a mesh width between 1.5 and 10 millimeters, thereafter dried in a drier 44 and finely again moistened at the moistening device 45 in a controlled manner so that their moisture content, depending upon the type of wood and the contemplated use thereof, is between 5 and 12 percent.

In order to produce the fine shavings or chips, flat chips having a thickness of prefereably 0.2 to 0.4 millimeters are initially admixed with up to 30 percent water in a mixer 48, and thereafter broken up in a chip disintegrator or perfecting machine 49 into fine chips having a diameter of less than 0.1 millimeters and a fineness ratio greater than 1:50. Such chip perfecting machines or disintegrators are well known from the paper and cellulose industry and typically possess a stationary disc and a rotating disc between which the chips are torn up or disintegrated. The fine chips are then dried in a dryer 50, sifted in an air sifter 51, and finally moistened in controlled fashion in a moistening device 52 so that their moisture content, again as a function of the contemplated use, lies between 8 and 15 percent.

The coarse chips and the fine chips are, then separately from one another, glued together in the respective gluing drums 55 and 56 by means of a urea formaldehyde resin. The quantity of this resin in the case of the coarse chips or shavings amounts to 6 to 12 percent and for the fine chips 8 to 15 percent, based upon the weight of the absolutely dry wood. The glued chips are then deposited in silos 57 and 58 respectively.

The paper used for the decorative layer is commercially available on the market and preferably possesses a weight of 80 g/m². This paper is imbued in a soaking or imbuing installation 60 with a thermosetting resin and preferably with a melamine aldehyde solution, and thereafter dried in a tunnel furnace 61. The paper web imbued with the plastic resin and departing from the tunnel furnace 61 is much too stiff to be again rolled-up, and therefore is immediately cut into lengths required for the further possessing by means of an impact cutter 62 and then stacked at the stacker 63 into sheets.

The coarse chips and the fine chips are sucked from the silos 57 and 58 respectively, into a strewing machine 65 arranged above an endless transport or conveyor band, the width of which amounts to for instance 2 meters. The strewing machine 65 initially strews onto this conveyor band an approximately 1 centimeter thick layer of fine chips, thereafter an approximately 4 centimeter thick layer of coarse chips and thereafter again an approximately 1 centimeter thick layer of fine chips. The strewing machine 65 strews the fine chips in such a manner that the underside of the lower fine chip layer and the upper surface of the upper fine chip layer possess the finest size of the fine chips and the faces or sides of the fine chip layers neighboring the coarse chip layer possess the coarser size fine chips. This increase of the "coarseness" of the fine chip layers from the outside towards the inside can be readily verified at the finished decorative chip board. The three-layered chip stock or fill is then guided by the continuously moving transport or conveyor band beneath a cutting saw or other suitable cutter 66 which then sub-divides the uninterrupted chip stock into sections of for instance 3 meters length. The sections of the chip stock are then taken over by a further discontinuously moving transport or conveyor band which introduces the cut sections quickly into a pre-stress 67 where each section is compressed into a chip cake or briquet of about 2 centimeters thickness by being subjected to a pressure of about 30 kg/cm². Since the press is not heated the chips of the chip briquets containing the melamine aldehyde resin are not yet glued to one another.

At the next station 70 a sheet-metal press member having its high-luster polished surface facing upwards is placed upon the transport band and upon this high-luster polished surface there is placed a sheet of decorative paper. In order to simplify the showing of FIG. 4, the sheet-metal press member has been depicted in FIG. 3 by reference character 90 and the previously indicated sheet of decorative paper corresponds to the decorative layer 34 of FIG. 3. Now over the decorative paper there is then placed the pre-pressed or pre-compressed chip briquet produced according to the fabricating techniques explained above. During further transport there is placed a second decorative paper onto the chip briquet. This further decorative paper would correspond, for instance, to the decorative layer 33 of the arrangement of FIG. 3. Then the entire stack formed in this manner is covered with a second sheet-metal press member at station 71. This second sheet-metal press member possesses at its underside or under face intended to bear upon the topmost situated decorative sheet relief-like raised portions. Here also, for the purpose of simplifying the illustration in FIG. 3 there has been shown in phantom lines the second sheet-metal press member 91 possessing the relief-like carrier portion 92 equipped with the indicated relief-like raised portions 93. Now the finished stack consisting of the lower sheet-metal press member 90, the lower decorative sheet, the chip briquet, the upper decorative sheet and the upper sheet-metal press member 91 are then further transported into a press charging device 72 which can receive 15 of the aforementioned stacks arranged in superimposed fashion and separated from one another. As soon as all platforms of the press charging device 72 have been charged with these finished stacks then the 15 stacks are displaced by this press charging device into a stage or multilayer press 73 and compressed and glued together for approximately 15 minutes with a pressure of 20 kg/cm². In order that the coating of melamine aldehyde resin of the chips and the melamine aldehyde resin impregnation of the decorative layers can harden or cure and glue together the individual components, the press which is initially cold is heated during the first 5 minutes up to a temperature of 140°C, remains during the next 5 minutes at this temperature, and then for about the next 5 minutes is again cooled down. Due to cooling of the boards hardening of the melamine resin can be controlled, so that in particular it is possible to faborably influence the mechanical properties of the finished chip boards.

The pressed, glued together decorative chip boards which are provided at their surface with the relief-like depressions or formed portions 35, 36 (FIG. 3) governed by the configuration of the contact surface of the upper sheet-metal press member 91 are then displaced out of the multilayer press 73 and onto a discharge mechanism 74 and from this location are further placed upon a transport band 75. Then, initially the upper sheet-metal press member 91 is removed and delivered via a cleaning station 76 for renewed use to the station 71 in front of the press charging device 72. The decorative chip boards are then transported to a checking station 77 where faulty boards are eliminated and the properly manufactured boards further conveyed for cutting up into prescribed commercially usable sizes. The lower sheet-metal press members are transported into a cleaning station 78 and from that location are delivered back to the applying station 70 for renewed use thereat.

In order to avoid contamination of the sheet-metal press members and the decorative layers by the wooden shavings or chips which cannot be avoided at the surrounding regions of the strewing machine 65 and the cutting saw 66 the method of the invention is preferably carried out in two rooms or spaces which are separated from one another by at least one wall 80. The throughpassage 81 between both areas or spaces is advantageously constructed as a conventional pressure or charging sluice.

Of course, it is to be understood that the above-described method can be modified in a number of different ways. For instance, it is not absolutely essential to carry out the moistening and gluing operations for the chips separately, rather both of these treatments can also be carried out in the same working operation. It is also not absolutely necessary for the gluing of the decorative paper and the chips to use thermosetting material and specifically melamine aldehyde resin solutions. For instance, in order to fabricate heat-resistant decorative layers such can also be imbued with acrylic resins. Further, in order to improve the strength of adherence of the decorative layers it is possible to insert between each decorative layer and the neighboring fine chip layer also an additional foil formed of a non-polymerized synthetic resin. It is also to be understood that the pressures, temperatures as well as the temperature-time course used during the pressing operations are dependent upon the employed synthetic resin. Furthermore, it is also not necessary for the purpose of pressing-in the relief-like formed portions at the decorative layer and the fine chip layer located there beneath to use a sheet-metal member possessing appropriate raised portions, rather a separate relief carrier can also be placed between the decorative layer and the sheet-metal press member. A particularly inexpensive relief carrier can embody a paper layer provided with patterns or decorative portions and consisting of applied gypsum. This paper layer or sheet for the relief carrier can at least partially contain mineral substances. In order to ensure for a faultless separation of the sheetmetal press member and the relief carrier from the decorative layer and in order to impart to the decorative layer a particularly dull tone it is possible to also insert an additional separation layer during the pressing operation between the decorative layers and the sheet-metal press members and where applicable the relief carrier. Such separation layer can for instance consist of siliconized paper or an aluminium foil.

While there is shown and described present preferred embodiment of the invention, it is to be distinctly understood that the invention is not limited thereto but may be otherwise variously embodied and practiced within the scope of the following claims.

Accordingly, what is claimed is:

1. A method for fabricating a wood-chip board equipped with at least one decorative layer provided with relief-like formed portions, comprising the steps of:
   a. strewing onto a first decorative paper sheet being impregnated with curable resinous material a first fine chip layer comprising wooden fibers with a diameter of less than 0.1 mm and exhibiting a fineness ratio of at least 1:50 and being glued with a curable resinous material so as to provide a deformable layer;
   b. strewing onto the said first fine chip layer a coarse chip layer, said coarse chips having a lateral length of up to 10 millimeters;
   c. strewing onto the said coarse chip layer a second fine chip layer;
   d. precompressing said coarse and fine chip layers;
   e. placing a second deformable decorative paper sheet over said second fine chip layer, said deformable decorative sheet also being impregnated with curable resinous material;
   f. placing a non-metallic relief carrier provided with relief-like protuberances on top of said second decorative layer;
   g. applying pressure and heat to said relief carrier and underlying layers to form said relief-like pattern in said second decorative layer and at least in the neighboring portions of the second fine chip layer wherein the depth of the relief is greater than the thickness of the decorative layer; and simultaneously,
   h. bonding together said chip stock layers and said decorative layers.

2. The method as defined in claim 1, further including the step of using as the relief carrier a paper sheet which at least partially contains mineral substances.

3. The method as defined in claim 1, including the step of using an aluminium foil as the separation layer.

4. The method as defined in claim 1, further including the step of inserting a separation layer between the relief carrier and the neighboring decorative layer to improve separation of such decorative layer and relief carrier from one another.

5. The method as defined in claim 4, including the step of using an aluminium foil as the separation layer.

6. The method as defined in claim 1 wherein said chips are bound together with a thermosetting resin selected from the group consisting essentially of urea formaldehyde or melamine aldehyde, said deformable decorative layer being impregnated with a thermosetting resin selected from the group consisting of melamine aldehyde or acrylic resins.

* * * * *